United States Patent [19]

Hasuda

[11] Patent Number: 5,384,614
[45] Date of Patent: Jan. 24, 1995

[54] LENS INSTALLING/REMOVING DEVICE

[75] Inventor: Masanori Hasuda, Yokohama, Japan

[73] Assignee: Nikon Corporation, Tokyo, Japan

[21] Appl. No.: 86,366

[22] Filed: Jul. 6, 1993

Related U.S. Application Data

[63] Continuation of Ser. No. 978,407, Nov. 18, 1992, abandoned.

[30] Foreign Application Priority Data

Nov. 29, 1991 [JP] Japan .................. 3-340114

[51] Int. Cl.⁶ ............................................. G03B 17/12
[52] U.S. Cl. ................................................. 354/286
[58] Field of Search ...................................... 354/286

[56] References Cited

U.S. PATENT DOCUMENTS

| | | | |
|---|---|---|---|
| 4,457,609 | 7/1984 | Tomino et al. | 354/286 |
| 4,483,603 | 11/1984 | Metabi et al. | 354/402 |
| 4,589,753 | 5/1986 | Kawai | 354/400 |
| 4,623,234 | 11/1986 | Shimizu et al. | 354/286 |
| 4,748,467 | 5/1988 | Maekawa et al. | 354/286 |
| 4,766,453 | 8/1988 | Shiokama et al. | 354/286 |
| 4,860,043 | 8/1989 | Kurei et al. | 354/286 |
| 5,012,264 | 4/1991 | Nagano et al. | 354/286 |

Primary Examiner—Michael L. Gellner
Assistant Examiner—Nicholas J. Tuccillo
Attorney, Agent, or Firm—Shapiro and Shapiro

[57] ABSTRACT

Disclosed in a lens installing/removing apparatus for installing and removing a photographing lens including at least impingement surfaces and bayonet pawls or threads to and from a camera body, the apparatus comprising: a fixed mount unit, having an impingement surface which impinges on the impingement surface of the photographing lens, for placing the photographing lens in a predetermined position in the optical axis direction with respect to the camera body; a movable mount unit, so supported inwardly of the fixed mount unit as to be rotatable about the optical axis and having bayonet pawls or threads which engage with the bayonet pawls or the threads, for taking an installing position to install the photographing lens in the camera body and a removing position to remove the photographing lens from the camera body; and a driving means for rotationally driving the movable mount unit.

22 Claims, 7 Drawing Sheets

LENS INSTALLING/REMOVING DEVICE

This is a continuation of application Ser. No. 978,407 filed Nov. 18, 1992, now abandoned.

BACKGROUND OF THE INVENTION

Field of the Invention

The present invention relates to a lens installing-/removing device for automatically installing and removing a photographing lens to and from a camera body.

Related Background Art

FIG. 1 is a perspective view illustrating a mount mechanism unit of the conventional photographing lens. A lens mount 3 is provided at the rear end of an interchangeable lens 2. This lens mount 3 includes bayonet pawls 3a, 3b, 3c formed outwards and connected to a body mount 10 (FIG. 2) which will be mentioned later.

Further, an impingement surface 3d is defined as a surface which impinges on the body mount 10. The impingement surface 3d serves as a reference position of the interchangeable lens 2 in the optical-axis direction when attaching the interchangeable lens 2 to the body.

A fitting part 3e is formed in a wall-like configuration adjacent to the impingement surface 3d around the optical axis. The fitting part 3e is fitted to a fitting part of the body mount 10 and serves as a reference surface for making the camera body 1 coincident with the optical axis of the interchangeable lens 2. Note that a major diameter of the fitting part 3d is larger than a major diameter of each of the bayonet pawls 3a-3c.

A protruded member of the body mount 10 is fitted in a reference notch 3f formed in the impingement surface 3d, the reference notch 3f serving as a reference for locating the camera body 1 and the interchangeable lens 2 in the direction around the optical axis.

A lens type signal groove 3g is intended to identify a type of lens between the camera body and the interchangeable lens 2, the system being such that a signal is distinguished depending on an existence and non-existence of this groove.

Incidentally, in the lens type signal groove 3g, a pin 18 projecting, though explained later, from the body mount 10 and movable in the optical axis direction drops down from the impingement surface 3d with a rotation about the optical axial due to attaching/detaching of the interchangeable lens 2. For this reason, an oblique surface 3i is formed from the impingement surface 3d to a bottom surface of the groove at least on the dropping side of the pin 18 at the end part of the lens type signal groove 3g in the peripheral direction around the optical axis.

Further, the above-mentioned reference notch 3f and the lens type signal groove 3g are disposed to differentiate a distance from an optical axis OP in the radial direction. Fitted in a hole 3h is an AF coupling 9 which will be stated later.

An aperture ring 4 is so mounted on the interchangeable lens 2 as to be rotatable about the optical axis. This aperture ring 4 is formed with a aperture transferring member 4a protruding in the radiant direction; and note that an aperture scale 4b is formed on the outer surface thereof. The interchangeable lens 2 is formed with an aperture index 2a. An unillustrated aperture mechanism incorporated into the interchangeable lens 2 is set to its aperture value by matching the aperture scale 4b with the aperture index 2a.

An aperture lever 5 is so provided at the rear end of the interchangeable lens 2 as to be substantially parallel with the optical axis and movable substantially in the vertical directions, the aperture lever 5 being biased downwards. This aperture lever 5 interlocks with the aperture ring 4 and the unillustrated aperture mechanism. When the aperture ring 4 is set to an open aperture value, the aperture lever 5 is in the uppermost position of the vertical stroke. Further, when set to the minimum aperture value, the aperture lever 5 is in the lowermost position. Still further, when set between the open aperture value and the minimum aperture value, the aperture lever 5 is in a proper mid-position of the vertical stroke.

Additionally, the aperture lever 5 is located in the uppermost position by an external manipulation resisting a biasing force thereof, whereby the unillustrated aperture mechanism set to the aperture value by use of the aperture ring 4 can be also subjected to an open-aperture variation. A so-called stop-down behavior is given thereto.

Hence, for instance, if the aperture ring 4 is set to the minimum aperture value, the unillustrated aperture mechanism is controllable to an arbitrary aperture value in a range from its open aperture value to the minimum aperture value by externally manipulating the aperture lever 5.

An open aperture value signal member 6 works to transfer the open aperture value provided on the internal part of the lens mount, the system being such that the open aperture value is distinguished in accordance with a position in the peripheral direction around the optical axis.

A lens contact-point unit 7 serves to relay a transmission of an electric signal between the camera body and the interchangeable lens. The lens contact-point unit 7 is provided with at least one or more contact points 7a. The respective contact points 7a are disposed in positions at equal distances from the optical axis within a plane vertical to the optical axis. Further, the respective contact points 7a are movable in the radiant direction from the optical axis and biased in such directions as to move away from the optical axis.

A focal distance signal member 8 is a member, provided inwardly of the lens mount 3, for distinguishing a focal distance, the system being such that the focal distance is distinguished depending on a position of this focal distance signal member 8. Therefore, a focal distance signal transmission mechanism (details will hereinafter be explained) provided inwardly of the camera body slides on the focal distance signal member 8 with a rotation about the optical axis due to the attaching-/detaching of the interchangeable lens 2 in the same way as the pin with respect to the above-mentioned lens type signal groove 3g. A guide oblique surface 8a thereof is therefore provided at least on its sliding side.

An AF coupling shaft 9 fitted into a hole 3h is formed with a slotted coupling groove 9a in its outside end surface. This AF coupling shaft 9 is disposed so as not to protrude from at least the impingement surface 3d.

Then, a part or whole of an unillustrated lens system disposed within the interchangeable lens 2 is constructed to move in the optical axis direction by rotationally driving this AF coupling shaft 9 from outside.

FIG. 2 is a front elevation depicting a mount mechanism unit of the conventional camera body.

Referring to FIG. 2, the optical axis OP extends in the direction perpendicular to the sheet surface.

The body-side mount 10 is attached to the unillustrated to the camera body. In the body mount 10, bayonet pawls 10a, 10b, 10c engage with the bayonet pawls 3a–3c of the lens mount 3 in a state where the interchangeable lens 2 is installed. The interchangeable lens 2 is biased towards the camera body by pushing the bayonet pawls 3a–3c of the lens mount 3 through an unillustrated bayonet spring mechanism disposed on the rear side of the bayonet pawls 10a–10c.

An aperture interlocking member 11 is disposed around the body mount 10 and so provided as to be rotatable about the optical axis OP. In the state where the interchangeable lens 2 is installed, an impingement part 11a impinges on the aperture transferring member 4a of the aperture ring 4, with the result that the aperture interlocking member 11 and the aperture ring 4 integrally move. Aperture information of the interchangeable lens 2 is transferred to the side of the camera body.

An aperture control lever 12 movable in the vertical directions has an impingement part 12a which impinges on the aperture lever 5 in the state where the interchangeable lens 2 is installed, with the result that the aperture control lever 12 and the aperture lever 5 substantially integrally move. Namely, the aperture control lever 12 is constructed to control a position of the aperture lever 5.

An open aperture value signal interlocking member 13 is so provided as to be rotatable about the optical axis OP. This open aperture value signal interlocking member 13 has an impingement part 13a which impinges on an open aperture value signal member 6 in the installed state of the interchangeable lens 2. A position of the open aperture value signal member 6 in the peripheral direction around the optical axis is transferred to the side of the camera body 1, thus transferring an open aperture value thereof.

A body contact point unit 14 is constructed so that contact points 14a thereof are contact-conductive to the contact points 7a on the side of the lens, thus receiving and transmitting the electric signals between the body 1 and the interchangeable lens 2.

An AF driving shaft 15 is formed with a projection 15a on its end surface. The projection 15a fitted in the coupling groove 9a of the AF coupling shaft 9 on the side of the interchangeable lens 2, thereby transferring a rotary motion of the AF driving shaft 15 to the AF coupling shaft 9.

Note that this AF driving shaft 15 is so disposed in the position protruding from an impingement surface 10d of the body mount 10 as to be biased in the protruding direction.

A focal distance signal interlocking member 16 movable in the direction of the optical axis OP is biased outwards. This focal distance signal interlocking member 16 impinges on the focal distance signal member 8 in the installed state of the interchangeable lens 2. A focal distance of the interchangeable lens 2 is transferred to the camera body 1 in accordance with the position thereof in the optical axis direction.

A lens type signal interlocking member 17 movable in the direction of the optical axis OP is disposed to protrude from the impingement surface 10d and biased in the protruding direction. This lens type signal interlocking member 17 transmits a lens type signal by taking a protruded position and an unprotruded position from the impingement surface 10d depending on an existence and non-existence of the lens type signal groove 3g in the installed state of the interchangeable lens 2.

An installation/removal pin 18 is so provided on the body mount 10 as to be movable in the direction of the optical axis OP. The pin 18 is disposed to protrude from the impingement surface 10d and biased in the protruding direction. This installation/removal pin 18 is fitted in the reference notch 3f of the lens mount 3 in the installed state of the interchangeable lens 2, thus locking the rotation of the interchangeable lens 2 in the peripheral direction.

An installation/removal button 19 operates substantially integrally with the AF driving shaft 15 and the installation/removal pin 18. This installation/removal button 19 is capable of moving the AF driving shaft 15 and the installation/removal pin 18 to at least the unprotruded position from the impingement surface 10d by pushing them in the direction of the optical axis OP.

Given next is an explanation of a method of installing and removing the interchangeable lens 2 to and from the mount mechanism unit of the conventional camera body 1.

To start with, when installing the interchangeable lens 2, the bayonet pawl 3a of the interchangeable lens 2 is interposed between the bayonet pawls 10a and 10b of the body mount 10; the bayonet pawl 3b is interposed between the bayonet pawls 10b and 10c; and the bayonet pawl 3c is interposed between the bayonet pawls 10c and 10a. The lens mount 3 is inserted into the body mount 10, whereby the fitting part 3e is fitted in the fitting part 10e. Further, the impingement surface 3d impinges on the impingement surface 10d. At this moment, the AF driving shaft 15, the lens type signal interlocking member 17 and the installation/removal pin 18 are pushed by the impingement surface 3d and thereby moving to the unprotruded position from the impingement surface 10d.

In this state, the interchangeable lens 2 is rotated anticlockwise in FIG. 2. When the reference notch 3f comes to the position of the installation/removal pin 18, the pin 18 drops into the reference notch 3f, thereby locking the rotation in the peripheral direction.

At this time, the bayonet pawls 3a, 3b, 3c are substantially in such positions as to overlap with the bayonet pawls 10a, 10b, 10c. The interchangeable lens 2 is biased towards the camera body 1 by unillustrated bayonet springs disposed respectively between the bayonet pawls 3a, 10a, between the bayonet pawls 3b, 10b and between the bayonet pawls 3c, 10c. With this arrangement, the interchangeable lens 2 is held in a state of impinging on the impingement surface 10a of the camera body 1. A position of .the interchangeable lens 2 in the optical axis direction is thus determined.

Further, the fitting part 3e is fitted in the fitting part 10e, and hence the interchangeable lens 2 is made coincident with the optical axis OP of the camera body 1.

Engaged further and interlocked with each other 4 in the manner described above are the aperture ring and the aperture ring interlocking member 11, the aperture lever 5 and the aperture control lever 12, the open aperture value signal member 6 and the open aperture value signal interlocking member 13, the contact points 7a and the contact points 14a, the focal distance signal member 8 and the focal distance signal interlocking member 16, the AF coupling shaft 9 and the AF driving shaft 15, and the lens type signal groove 3g and the lens type signal interlocking member 17. The signals thereof are thus transmitted.

Next, the removable of the interchangeable lens 2 from the camera body 1 involves the steps of: initially pushing the installation/removal button 19 so as not to make the AF driving shaft 15 and the installation/removal pin 18 protrude from the impingement surface 10d; subsequently moving the bayonet pawls 3a, 3b, 3c to the positions between the bayonet pawls 10a, 10b and 10c by rotating the interchangeable lens 2 in the direction reverse to the direction when installed; and removing the interchangeable lens 2 by pulling it in the direction of the optical axis OP in those positions.

In the above-described conventional camera body and the mount mechanism unit of the interchangeable lens, the installation of the interchangeable lens 2 to the camera body 1 has hitherto required two steps of at the first onset, inserting the mount mechanism unit of the interchangeable lens 2 into the mount mechanism unit of the camera body 1; and thereafter rotating the interchangeable lens 2 about the optical axis.

For this reason, the installation of the interchangeable lens 2 takes a good deal of labors. Further, in some cases the interchangeable lens 2 is passed from one hand to the other according to the inserting and rotating operations depending on a weight and configuration of the interchangeable lens 2. There exists a possibility in which the interchangeable lens 2 may drop down.

Moreover, when fixing the interchangeable lens 2, in the case of a super telephoto lens, etc., to a tripod, the camera body 1 has to be rotated with respect to the interchangeable lens 2. The operating method differs from the ordinary one.

On the other hand, when detaching the interchangeable lens 2, there are needed the operations of rotating the interchangeable lens 2 while depressing the installation/removal buttons, and subsequently pulling it out of the camera body 1. There arises a problem, wherein more complicated operations than in the installing operation are demanded.

SUMMARY OF THE INVENTION

It is a primary object of the present invention to provide a lens installing/removing apparatus capable of installing and removing an interchangeable lens by a simpler operation.

To obviate the foregoing problems, according to one aspect of the present invention, there is provided a lens installing/removing apparatus for installing and removing a photographing lens including at least impingement surfaces and bayonet pawls or threads to and from a camera body, the apparatus comprising: a fixed mount unit (21), having an impingement surface (21b) which impinges on the impingement surface of the photographing lens, for placing the photographing lens in a predetermined position in the optical axis direction with respect to the camera body; a movable mount unit (22), so supported inwardly of the fixed mount unit as to be rotatable about the optical axis and having bayonet pawls or threads (22a, 22b, 22c) which engage with the bayonet pawls or the threads, for taking an installing position to install the photographing lens in the camera body and a removing position to remove the photographing lens from the camera body; and driving members (29, 28, 27) for rotationally driving the movable mount unit.

In this case, the apparatus is characterized in that a member for transmitting and receiving a signal with respect to the camera body in accordance with a rotational position of the photographing lens is retreated when driving the movable mount unit.

Further, the apparatus is characterized in that the driving members also serve as lens driving members for an auto-focus adjustment.

Still further, the apparatus is characterized in that a water-proof member is provided on the fixed mount unit or the impingement surface of the photographing lens.

According to the present invention, the mount on the body side is separated into the fixed mount unit and the movable mount unit. The movable mount unit is drive-controlled by the driving members, thereby making it possible to install and remove the photographing lens.

BRIEF DESCRIPTION OF THE DRAWINGS

Other objects and advantages of the present invention will become apparent during the following discussion taken in conjunction with the accompanying drawings, in which.

DESCRIPTION OF THE PREFERRED EMBODIMENTS

The present invention will hereinafter be described in detail by way of embodiments with reference to the drawings.

Figure 3:
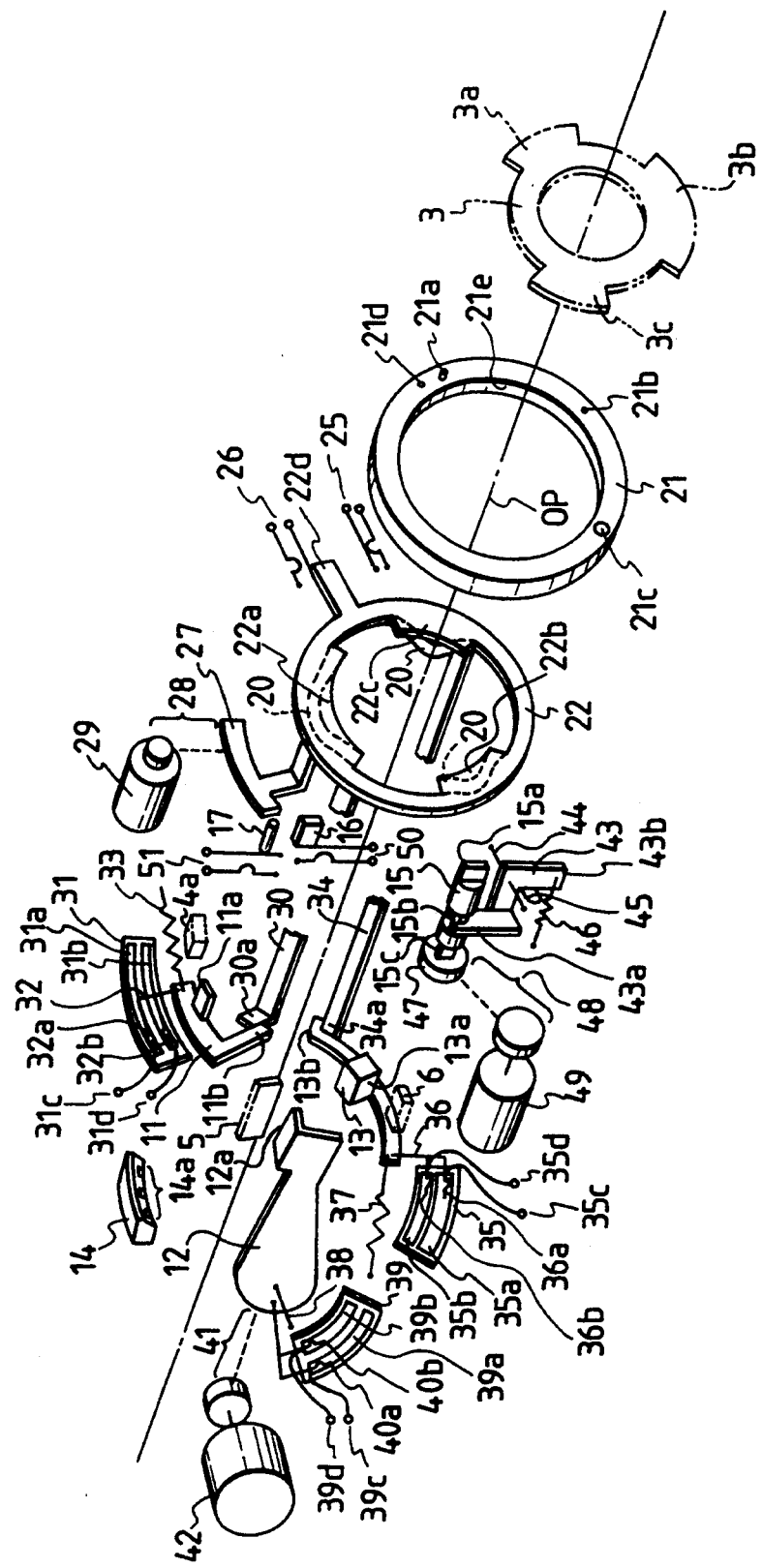
FIG. 3 is a developed perspective view demonstrating a first embodiment (wherein an interchangeable lens is not installed) of a lens installing/removing apparatus according to the present invention.
Figure 4:
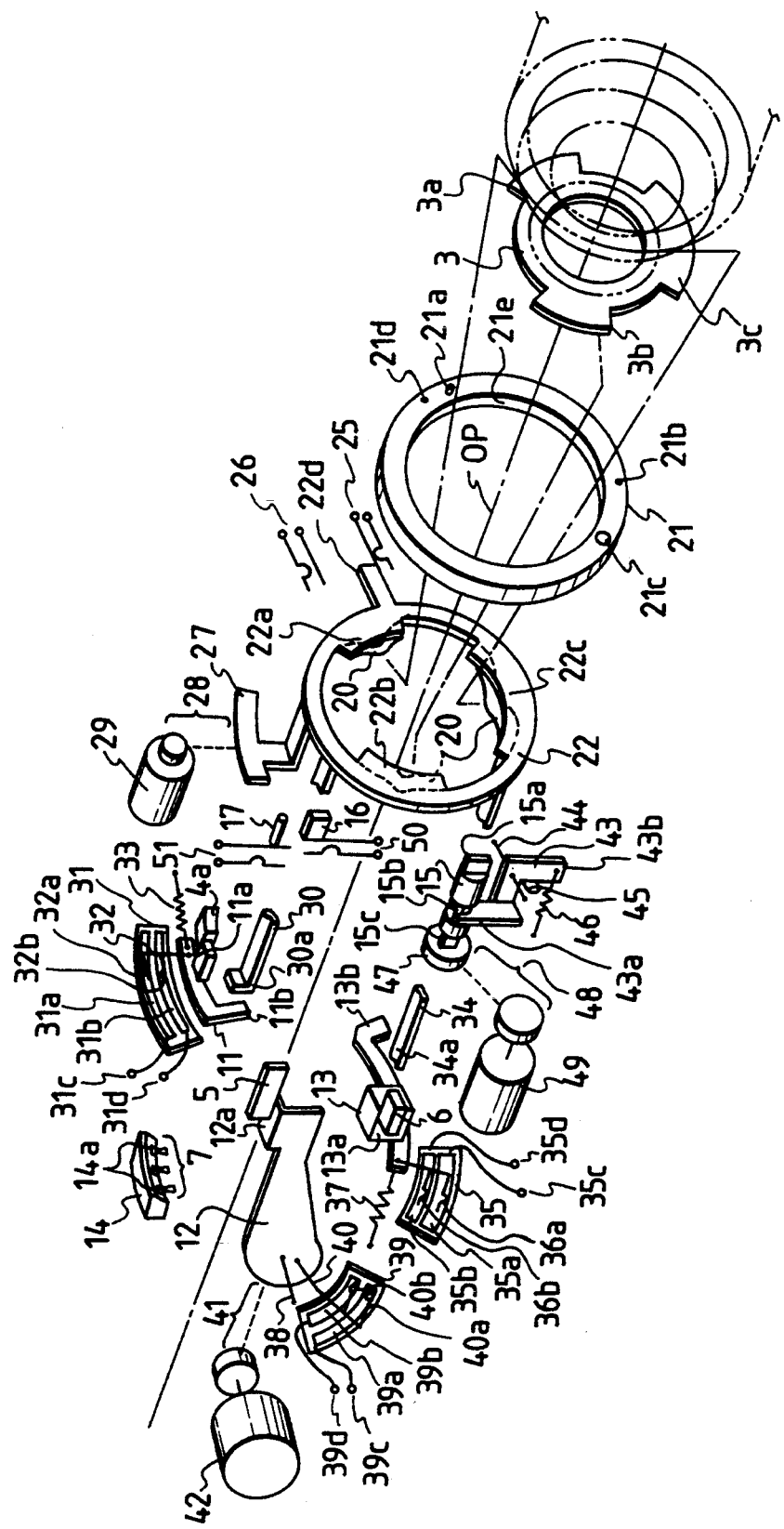
FIG. 4 is a developed perspective view demonstrating the first embodiment (wherein the interchangeable lens is installed) of the lens installing/removing apparatus according to the present invention.
Figure 5:
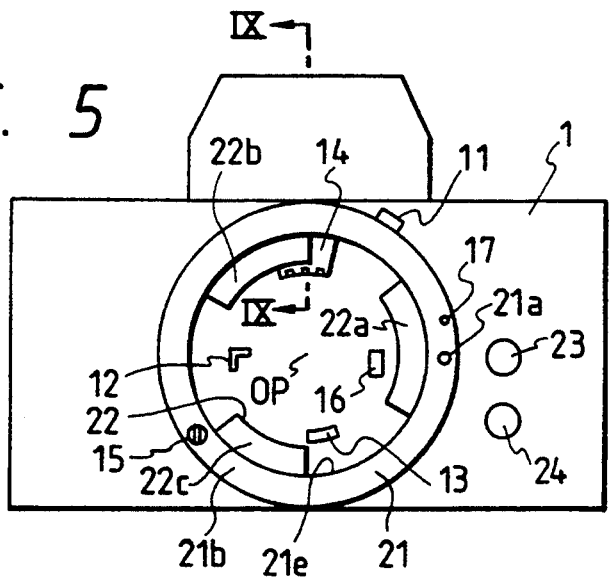
FIG. 5 is a front elevation depicting the principal portion of the lens installing/removing apparatus in accordance with the first embodiment.

FIGS. 3 through 5 are views demonstrating a first embodiment of a lens installing/removing apparatus according to the present invention. FIG. 3 is a developed perspective view illustrating a state where no interchangeable lens is installed. FIG. 4 is a developed perspective view depicting a state where the interchangeable lens is installed. FIG. 5 is a front elevation.

Note that in the following discussion of respective embodiments, the members performing the same functions as those in the conventional example described above are marked with the like symbols.

Turning to FIG. 3, a fixed mount 21 defined as an annular member is secured to a camera body 1 (FIG. 5) so that its center coincides with an optical axis OP. This fixed mount 21 is formed with a reference pin 21a, fitted in a reference notch 3f of a lens mount 3, for regulating a movement of an interchangeable lens 2 in the peripheral direction in an installed state of the interchangeable lens 2, an impingement surface 21b which impinges on an impingement surface 3d and a fitting part 21e fitted to a fitting part 3e. The fixed mount 21 is further formed with a hole 21c into which an AF driving shaft 15 is fitted and a hole 21d into which a lens type signal member 17 is fitted.

A movable mount 22 defined as an annular member is so attached as to be annularly movable inwardly of the fixed mount 21.

This movable mount 22 is formed with bayonet pawls 22a, 22b, 22c; and aforementioned bayonet springs 20 each assuming a leaf-spring-like configuration are secured to the undersurface thereof. Hence, during a lens installation, as illustrated in FIG. 4, the movable mount 22 rotates clockwise. In such positions that bayonet pawls 3a, 3b, 3c of the lens mount 3 overlap with bayonet pawls 22a, 22b, 22c in the peripheral direction, the bayonet springs 20 push bayonet pawls 3a, 3b, 3c. The impingement surface 3d impinges on the impingement surface 21b. In this state, the interchangeable lens 2 is installed and held.

Further, the movable mount 22 is provided with a switch changeover part 22d. This switch changeover part 22d turns ON a removal switch 26 in a lens removing position and turns ON an installation switch 25 in a clockwise-rotated lens installing position. The installing/removing positions of the movable mount 22 are therefore identifiable on the basis of ON/OFF states of the switches 25, 26.

Further, an automatic interlocking gear 27 is attached to the movable mount 22. An installation/removal motor 29 can be rotationally driven through a transmission gear train 28. Secured to this movable mount 22 are an aperture interlock release lever 30 and an open aperture value signal interlock release lever 34.

An aperture ring interlocking member 11 is biased clockwise in FIG. 3 by means of a spring 33. A brush 32 is attached to this aperture ring interlocking member 11. Slide parts 32a, 32b respectively slide on a resistor 31a or a conductor 31b of a resistance plate 31. A position of the aperture ring interlocking member 11 in the peripheral direction can be known from a resistance value between terminals 31c and 31d.

Note that in a detachable state of the interchangeable lens 2, an end part 30a of the aperture interlock release lever 30 pushes an end part 11b of the aperture ring interlocking member 11 in the anticlockwise direction resisting a biasing force of the spring 33, whereby the aperture ring interlocking member 11 is held at a rotary end where an impingement end 11a in the anticlockwise rotational direction along the periphery does not impinge on the aperture transferring part 4a.

Further, in the lens installed state, a relation of stroke is determined so that the end part 30a of the aperture interlock release lever 30 runs off at a rotary stroke or greater of the end part 11b in the clockwise direction.

An open aperture value interlocking member 13 is biased clockwise in FIG. 3 by means of a spring 37. A brush 36 is fitted to this open aperture value interlocking member 13. Slide parts 36a, 36b thereof respectively slide on a resistor 35a and a conductor 35b of a resistance plate 35. A position of the open aperture value interlocking member 13 in the peripheral direction can be known from a resistance value between terminals 35c and 35d.

Note that in the detachable state of the interchangeable lens 2, an end part 34a of an open aperture value interlock release lever 34 pushes an end part 13b of the open aperture value interlocking member 13 in the anticlockwise direction resisting a biasing force of a spring 37. The open aperture value interlocking member 13 is thereby held at a rotary end where an impingement part 13a in the anticlockwise rotational direction along the periphery does not impinge on the open aperture value signal member 6.

Further, in the lens installed state, the relation of stroke is determined so that the end part 34a runs off at the rotary stroke or greater of the end part 13b in the clockwise direction.

An aperture control lever 12 is rotatable about a shaft 38. This aperture control lever 12 is fitted with a brush 40. Slide parts 40a, 40b respectively slide on a resistor 39a and conductor 39b of a resistance plate 39. A position of the aperture control lever 12 in the rotating direction can be known from a resistance value between terminals 39c and 39d.

It is to be noted that the aperture control lever 12 is rotationally drivable by an aperture control motor 42 through a transmission gear train 41. In the lens detachable state, the aperture control lever 12 is positioned at a rotary end where an impingement part 12a thereof in the clockwise direction does not impinge on the aperture lever 5.

Further, in this position, a resistance value between the terminals 39c and 39d is zero.

A body contact point unit 14 is formed with contact points 14a which are contact-conductive to the contact points 7a in the lens installed state.

The. AF driving shaft 15 includes a projection 15a formed at an end part on the lens side and is at the same time formed with a notch 15b and a slide part 15c. A lever 43 is so fitted as to be rotatable about a shaft 44. The lever 43 is formed with a U-shaped notch 43a at one end thereof. This notch 43a engages with the notch 15b of the AF driving shaft 15.

Further, a spring 46 is secured to the other end part 43b of the lever 43. The lever 43 is biased clockwise by this spring 46.

With this arrangement, the AF driving shaft 15 is biased in such a direction as to protrude from the impingement surface 21b of the fixed mount 21 through the notches 43a, 15b. A rotation of the lever 43 is regulated by a pin 45, and hence the AF driving shaft 15 is held in a position with a proper amount of protrusion from the impingement surface 21b.

On the other hand, a gear 47 is fitted in the slide part 15c. The AF driving shaft 15, though movable in the axial direction with respect to the gear 47, rotates integrally in the rotating direction.

Further, the gear 47 works to rotationally drive the AF driving shaft 15 by means of an AF motor 49 through a transmission gear 48.

Referring to FIG. 5, the numeral 1 designates a camera body, 23 an installation button for starting an installation of the lens; and 24 a removal button for starting the removable of the lens.

Further, a focal distance signal interlocking member 16 and a lens type signal interlocking member 17 are movable in the optical axis direction. As depicted in FIG. 3, a focal distance signal and a lens type signal of the interchangeable lens 2 are transmitted by turning ON or OFF a focal distance signal switch 50 or a lens type signal switch 51 depending on positions thereof.

Figure 6:
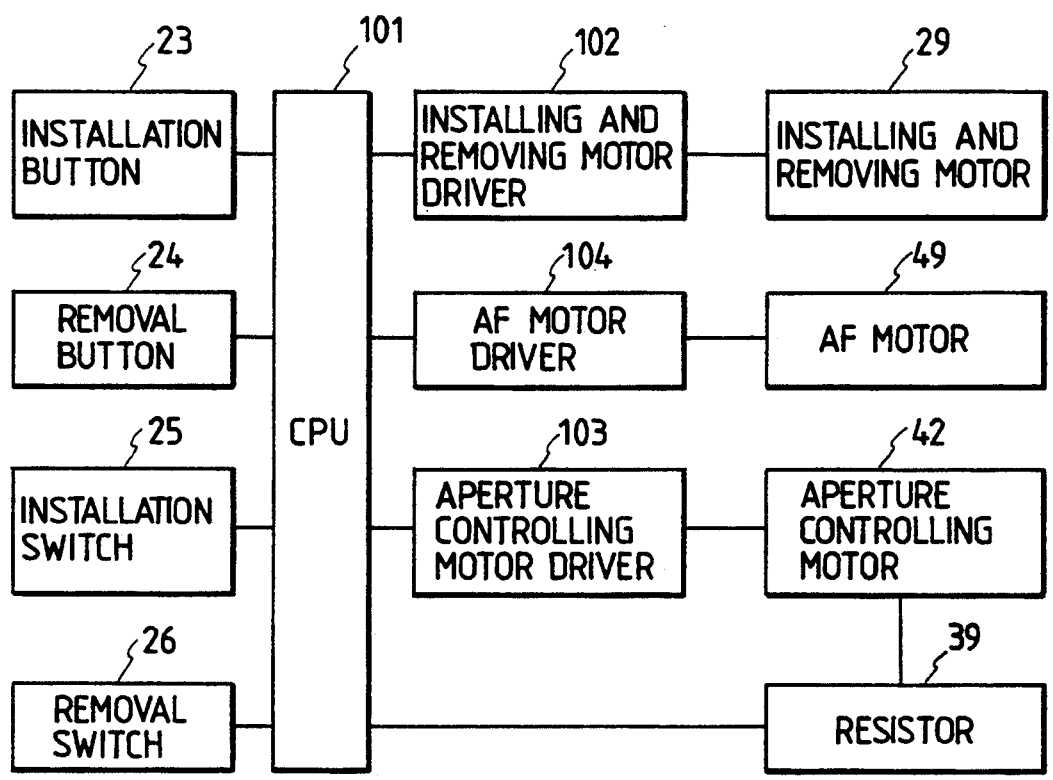
FIG. 6 is a block diagram depicting the lens installing/removing apparatus in the first embodiment.
Figure 8:
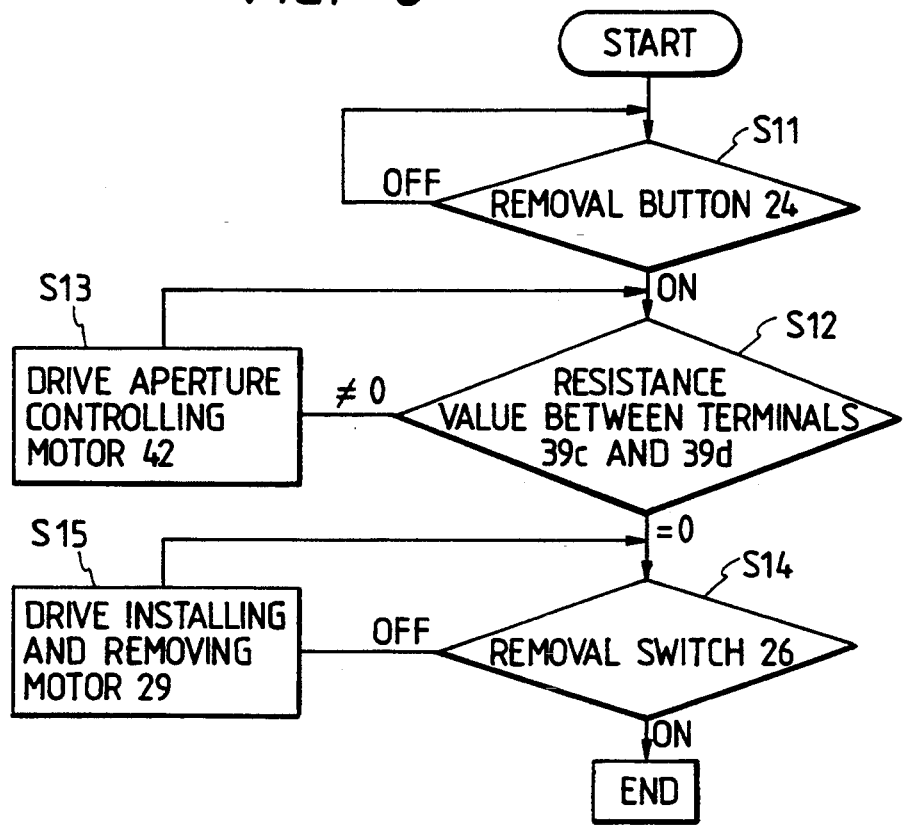
FIG. 8 is a flowchart showing moving operations in the first embodiment.

FIG. 6 is a block diagram illustrating a control unit of the lens installing/removing apparatus in the first embodiment. FIGS. 6 and 8 are flowcharts of assistance in explaining the operation of the control unit stated above.

The control unit in this embodiment constructed mainly of a CPU 101. Inputted to the CPU 101 are statuses of the installation button 23, the removable button 24, the installation switch 25 and the removable switch 26.

Further, an installation/removal motor 29, an aperture control motor 42 and an AF motor 49 are respectively connected to the CPU 101 via an installation/removable motor driver 102, an aperture control motor driver 103 and an AF motor driver 104. The drive control is effected in accordance with the flowcharts which will be mentioned later.

Furthermore, the CPU 101 to which a resistance value of a resistor 39 is also inputted is constructed to detect a position of the aperture control lever 12.

Next, the operation of the first embodiment will be described with reference to FIGS. 3 to 9.

The explanation begins with an operation of installing the interchangeable lens 2 by use of the lens installing-/removing apparatus in this embodiment.

Figure 1:
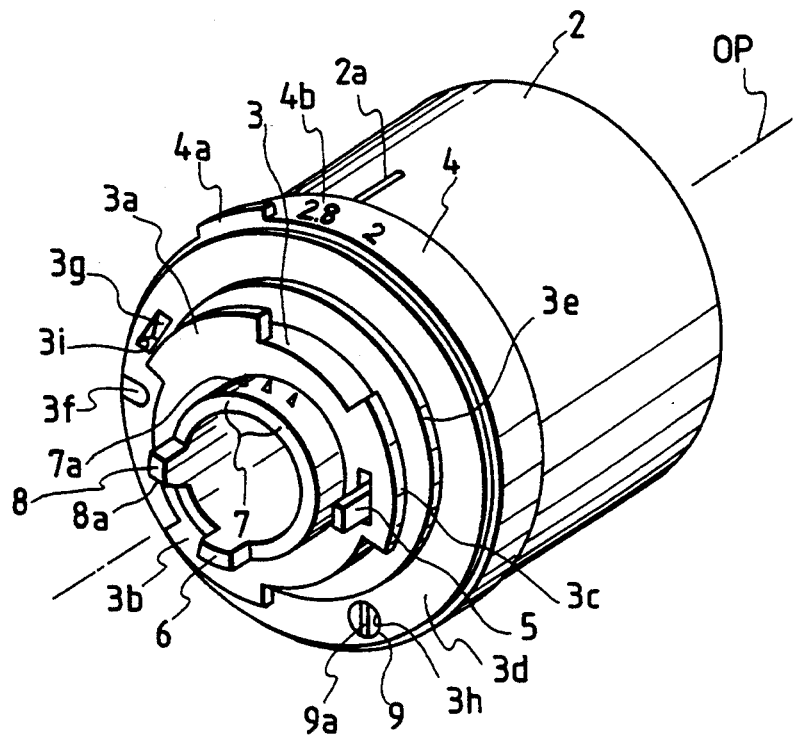
FIG. 1 is a perspective view illustrating a conventional lens mount unit.

The optical axis of the interchangeable lens 2 is made coincident with the optical axis of the body 1. The reference notch (see FIG. 1) of the lens mount 3 is matched with the reference pin 21a of the fixed mount 21. The interchangeable lens 2 is inserted up to a position where the impingement surface 3d of the mount 3 impinges on the impingement surface 21b of the mount 221.

At this moment, the movable mount 22 is located so that the bayonet pawl 3c of the lens mount 3 is interposed between the bayonet pawls 22a and 22b thereof; the bayonet pawl 3a is interposed between the bayonet pawls 22b and 22c; and the bayonet pawl 3b is interposed between the bayonet pawls 22c and 22a. Further, the fitting part 3e is fitted in the fitting part 21e in a state where the interchangeable lens 2 is inserted into the body 1.

Note that in this state, the contact points 7a are contact-conductive to the contact points 14a.

Further, a position of the focal distance signal interlocking member 16 in the optical axis direction is set in accordance with the focal distance signal member 8. The focal distance signal switch 50 is thereby turned ON or OFF. Focal distance information of the interchangeable lens 2 is transmitted to the body 1.

Similarly, a position of the lens type signal interlocking member 17 in the optical axis direction is set in accordance with the lens type signal groove 3g. The lens type signal switch 51 is thereby turned ON or OFF. Lens type information of the interchangeable lens 2 is transmitted to the body 1.

The projection 15a of the AF driving shaft 15 is fitted in the coupling groove 9a, if this projection 15a coincides in terms of rotating directional position with the coupling groove 9a of the AF coupling shaft 9. Whereas if not coincident, the AF driving shaft 15 is pushed resisting the biasing force of the spiring 46 by the AF coupling shaft 9. The slide part 15c moves to an axially-slid position with respect to the gear 47 and then stops in this position.

Further, in this state, the aperture ring interlocking member 11 and the aperture control lever 12 retreat in such positions that the aperture transferring part 4a and the aperture lever 5 do not impinge on the impingement part 11a and the impingement part 12a even in any position within a movable range thereof.

Similarly, the open aperture value signal interlocking member 13 retreats in such a position that the impingement part 13a does not impinge on the open aperture value signal member 6 even when the open aperture value signal member 6 in any position corresponding to the value thereof.

Figure 7:
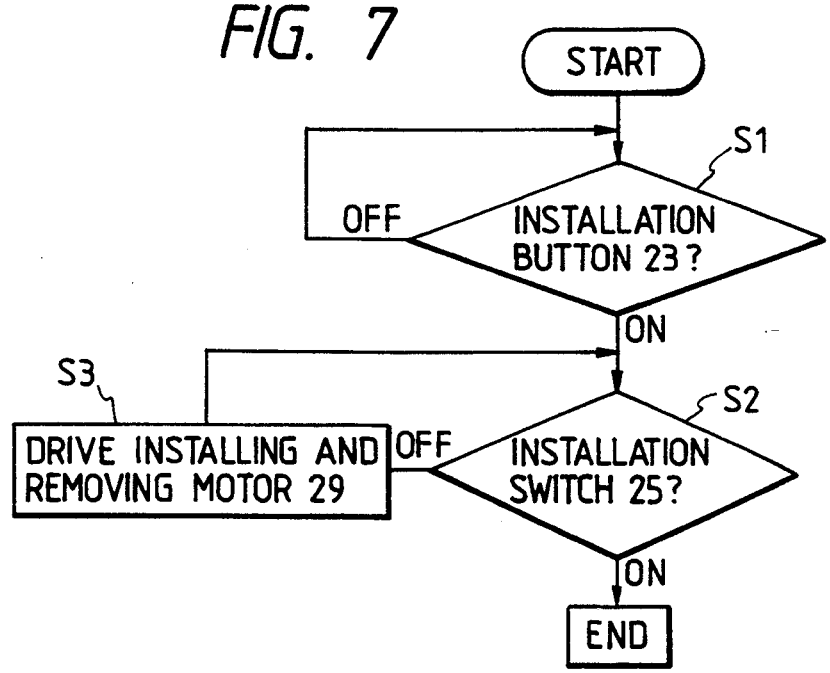
FIG. 7 is a flowchart showing installing operations in the first embodiment.

In the above-described state, when depressing the installation button 23, the CPU 101, as shown in the flowchart of FIG. 7, judges a status of the installation button 23 in step S1. When turned ON by depressing the installation button 23, the operation moves to step S2.

The CPU 101 judges a status of the installation switch 25 in step S2. If in an OFF state, the installation/removal motor 29 is driven to rotate the movable mount clockwise in steps S3.

The movable mount 22 is rotated clockwise, and a switch changeover part 22d turns ON the installation switch 25. Then, this sequence comes to an end, and the drive of the installation/removal motor 29 is also stopped.

At this time, the bayonet pawls 22a, 22b, 22c of the movable mount 22 are respectively in such positions as to substantially coincide with the bayonet pawls 3a, 3b, 3c of the lens mount 3 in the peripheral direction. The bayonet pawls 22a, 22b, 22c are further positioned between the bayonet pawls 3a, 3b, 3c and the impingement surface 3d in the optical axis direction.

Furthermore, the bayonet springs 20 are interposed between the bayonet pawls 22a, 22b, 22c and the bayonet pawls 3a, 3b, 3c. The bayonet springs 20 bias them in the pushing direction in the positions where the impingement surface 3d impinges on the impingement surface 21b. The interchangeable lens 2 is installed and held in the fixed mount 21.

Figure 9:
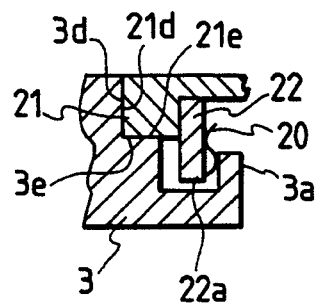
FIG. 9 is a sectional view taken substantially along the line IX—IX of FIG. 5.

FIG. 9 illustrates this state. FIG. 9 shows a relation between the bayonet pawls 3a and 22a. However, relations between the bayonet pawls 3b, 22n and between the bayonet pawls 3c, 22c are the same.

On the other hand, with clockwise rotations of the movable mount 22, an aperture ring interlock release lever 30 and an aperture ring interlock lever 34 also make clockwise rotations integrally therewith. Further, the aperture ring interlocking member 11 and the open aperture value interlocking member 13 also rotate clockwise while following up the rotations of the open aperture value release lever 34 by dint of biasing forces of the respective springs 33, 37.

Then, the aperture ring interlocking member 11 stops rotating in a position where the impingement part 11a impinges on the aperture transferring part 4a and in a position where the open aperture value signal interlocking member 13 impinges on the open aperture value signal member 6. Resistance values corresponding to these positions are set respectively by the resistors 31 and by the resistor 36. Aperture information and open aperture value information of the lens are transferred from the interchangeable lens 2 to the body 1.

Note that in the finally installed state, as discussed above, the end part 30a is positioned with a retreat more than the rotational stroke of the end part 11b, while the end part 34a is positioned with a retreat more than the rotational stroke of the end part 13b.

Further, the aperture ring 4 and the aperture ring interlocking member 11 integrally rotate in an as-impinged state of the aperture transferring part 4a upon the impingement part 11a. Even when moving the aperture ring 4 after being installed, the information thereof is transferred.

On the other hand, in the installed state of the interchangeable lens 2, the aperture value of the interchangeable lens 2 is, as described above, arbitrarily controllable by rotationally driving the aperture lever 12 with a drive of the aperture control motor 42.

Further, in the installed state, even if the projection 15a of the AF driving shaft 15 does not match with the coupling groove 9a of the AF coupling shaft 9, the AF driving shaft 15 is rotationally driven by driving the AF motor 49. The projection 15a is thereby matched with the coupling groove 9a, in which position the projection 15a then drops into the coupling groove 9a by the biasing force of the spring 46. Hence, the AF driving shaft 15 is thereafter capable of rotationally driving the AF coupling shaft 9.

FIG. 4 illustrates the state where the interchangeable lens 2 is installed in the lens installing/removing apparatus in accordance with the first embodiment. Note that in FIG. 4, the aperture ring interlocking member 11 and the open aperture value signal interlocking member 13 are at the end of the rotational stroke in the clockwise direction; the aperture control lever 12 is at the end of the rotational stroke in the anticlockwise direction, i.e., at the upper end of the vertical stroke of the aperture lever 5; the focal distance signal 50 is in the ON state; and the lens type signal switch 51 is in the OFF state.

Next, the operation of removing the interchangeable lens 2 from the body 1 will be explained.

When depressing the removal button 24 in the state where the interchangeable lens 2 is installed in the body 1, the CPU 101, as shown in the flowchart of FIG. 8, judges a status of the removal button 24 in step S11. When turned ON by depressing the removal button 24, the operation moves to step S12.

In step S12, a resistance value between terminals 39c and 39d is read. If the resistance value therebetween is not 0, the operation proceeds to step S13.

In step S13, the aperture control motor 42 is driven to rotate the aperture control lever 12 clockwise.

The aperture control lever 12 goes on rotating clockwise, and when the resistance value between the terminals 39c and 39d becomes 0 in step S12, the operation proceeds to step S14.

Judged in step S14 is whether the removal switch 26 is in the OFF state or not. If the removal switch 26 is kept OFF in step S14, the operation moves to step S15.

In step S15, the installation/removal motor 29 is driven to rotate the movable mount 22 anticlockwise.

The movable mount 22 goes rotating anticlockwise, and when the switch changeover part 22d turns ON the removal switch 26 in step S14, this sequence is finished. Then, the drive of the installation/removal motor 29 is also stopped.

During this process, the aperture ring interlocking lever 30 and the open aperture value signal interlocking lever 34 also rotate anticlockwise integrally with the movable mount 22. The end part 30a impinges on the end part 11b, while the end part 34a impinges on the end part 13b. Thereafter, the aperture ring interlocking member 11 and the open aperture value signal interlocking member 13 also rotate anticlockwise resisting the biasing forces of the respective springs 33, 37. In a position where at least the anticlockwise rotation of the movable mount 22 is ended, there are released the impingement of the impingement part 11a upon the aperture transferring part 4a and the impingement of the impingement part 13a upon the open aperture value signal member 6.

Then, in the position where the anticlockwise rotation of the movable mount is finished, there comes a positional relation wherein the bayonet pawls 22a, 22b, 22c do not engage with the bayonet pawls 3a, 3b, 3c. Hence, in this state, the interchangeable lens 2 can be detached by pulling the interchangeable lens 2 out of the body 1. A state of FIG. 3 is thus developed.

Incidentally, in accordance with this embodiment, the installation button 23 is separately provided. There is, however provided a switch having the same mechanism as the focal distance signal switch 50 and the focal distance signal interlocking member 16, the switch being constructed to be changed over when inserting the interchangeable lens 2 into the body 1. If the interchangeable lens 2 is equipped with a member for depressing the installation button 23 in the first embodiment, the installing action starts simultaneously when attaching the interchangeable lens 2 to the body 1. The operability is further improved.

Figure 10:
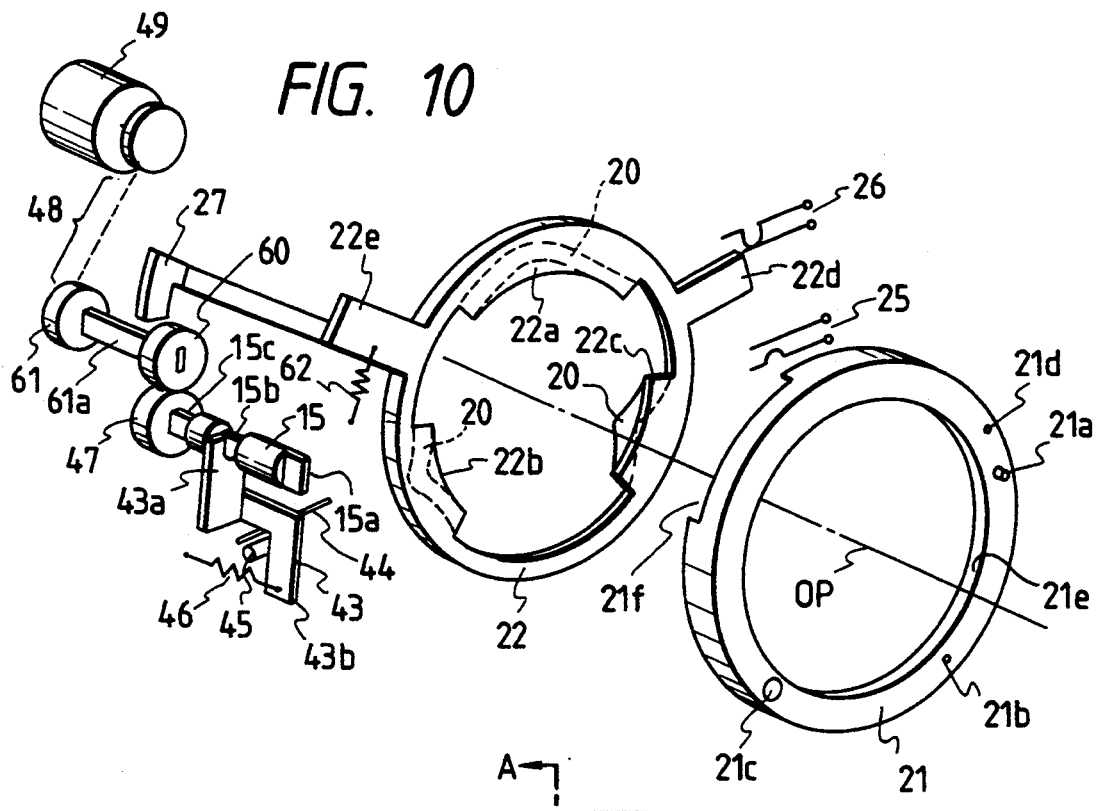
FIG. 10 is a developed perspective view demonstrating a second embodiment of the lens installing/removing apparatus according to the present invention.
Figure 11:
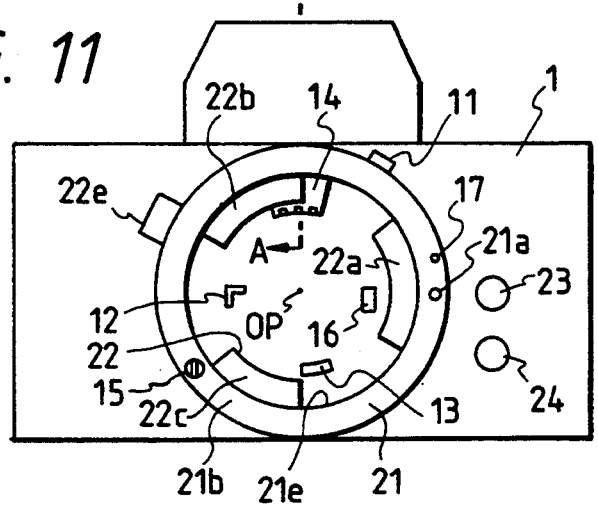
FIG. 11 is a front elevation illustrating the principal portion of the lens installing/removing apparatus in the second embodiment.

FIG. 10 is a perspective view illustrating a second embodiment of the lens installing/removing apparatus according to the present invention. FIG. 11 is a front elevation depicting a camera incorporating the lens installing/removing apparatus in accordance with the second embodiment.

Note that FIG. 10 illustrates only a mechanism unit for installing and removing the lens 2, wherein the lens 2 is not provided.

Referring to FIG. 10, a clutch gear 60 is fitted to a slide part 61a of a gear 61 and movable along the slide part 61 in the axial direction with respect to the gear 61. The clutch gear 60 is, however, structured to rotate integrally with the gear 61 in the rotating direction.

Further, the gear 60, as depicted in FIG. 10, meshes with a gear 47 in a normal state. When depressing the installation button 23 or the removal button 24, however, the gear 60 is slid on the slide part 61a by an unillustrated interlocking mechanism and moves to such a position as to engage with a gear 27.

Figure 2:
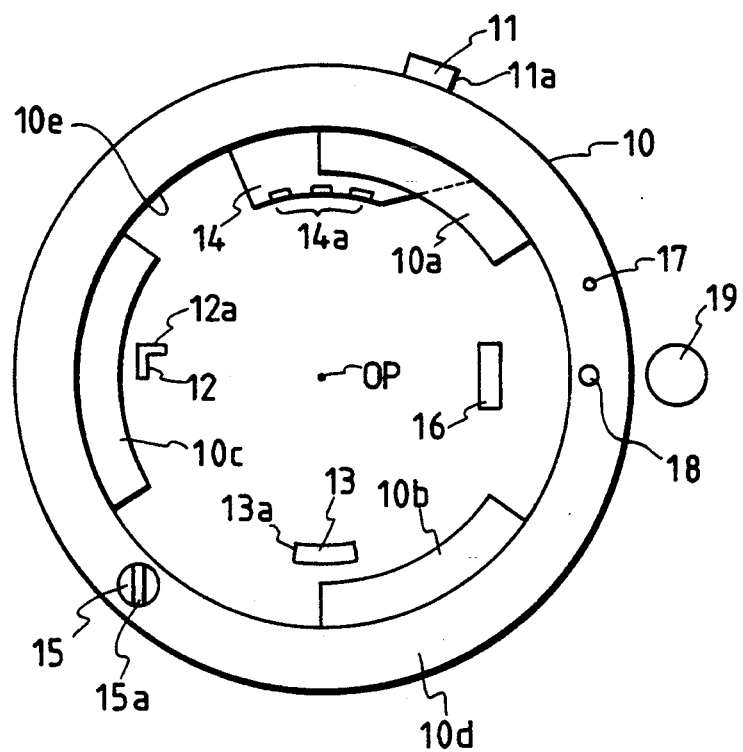
FIG. 2 is a front elevation showing a conventional body mount unit.

The movable mount 22 is formed with a manual operation part 22e extending outwards. The fixed mount 21 is formed with a notch 21f in a portion corresponding to an area defined by the installation/removal rotary range of this manual operation part 22e. As illustrated in FIG. 2, the manual operation part 22e is constructed to protrude outwardly of the fixed mount 21 via this notch 21f.

Further, a tension spring 62 hangs on the manual operation part 22e to bias the movable mount 22 in the anticlockwise direction (i.e., in the lens-removing direction). Note that the anticlockwise biasing force given by the tension spring 62 acts to rotate the movable mount in the anticlockwise direction in the uninstalled state of the lens 2. Whereas in the installed state of the lens 2, a power quantity of the biasing force is set enough not to rotate the movable mount 22 by dint of a frictional force working between the fixed mount 21 and the lens mount 3.

Speaking of the operation of the thus constructed mechanism, the operating procedures thereof are the same as those in the first embodiment demonstrated by FIG. 3. Further, in the connection with the operation of the internal structure, the installation/removal motor 29 may be replaced with an AF motor 49. In the flowcharts of FIGS. 7 and 8 also, the installation/removal motor 29 may be replaced with the AF motor 49.

Hence, the installation/removal motor 29 can be omitted to provide a much simpler mechanism when constructed as in the second embodiment.

Further, in the state where the installation button 23 or the removal button 24 is not depressed, the gear 27 does not mesh with the gear 60. It is therefore possible to manually rotate the manual operation part 22e of the movable mount 22.

Accordingly, the lens 2 can be installed and removed by manually rotating the manual operation part 22e even in a state where the AF motor 49 can not be driven as in the case of the battery being consumed up and so on.

Figure 12:
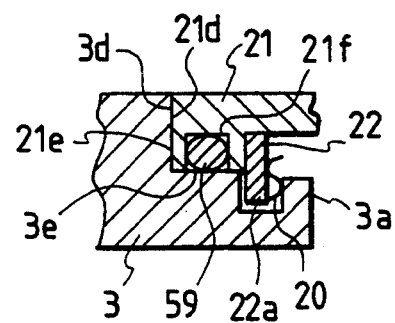
FIG. 12 is a sectional view depicting a connected state of the mount in the third embodiment of the lens installing/removing apparatus according to the present invention.
Figure 13:
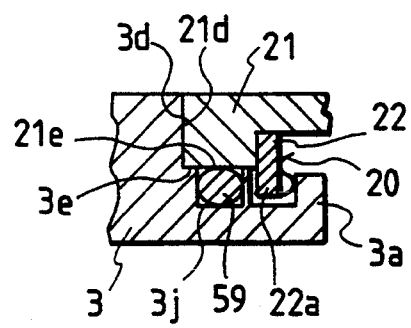
FIG. 13 is a sectional view illustrating a connected state of the mount in a fourth embodiment of the lens installing/removing apparatus according to the present invention.
Figure 14:
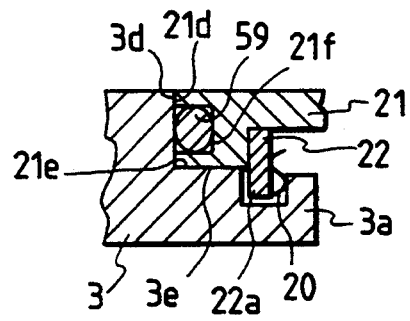
FIG. 14 is a sectional view showing a connected state of the mount in a fifth embodiment of the lens installing/removing apparatus according to the present invention.

FIGS. 12 through 14 are sectional views illustrating third to fifth embodiments of the lens installing/removing apparatus according to the present invention. In these embodiments, the lens installing/removing apparatus is applied to a water-proof mount.

FIG. 12 shows a state where the interchangeable lens 2 is installed in the body 1. A groove 21f is formed over the entire periphery of the fitting part 21e of the fixed mount 21, the structure being such that an annular O-ring 59 is fitted in the groove 21f.

Hence, when attaching the interchangeable lens 2 to the body 1, the fitting part 3e of the lens mount 3 is matched with the fitting part 21e of the fixed mount 21. At the same time, the O-ring 59 is compressively deformed and brought into a close contact with the fitting part 3e and the groove 21f as well. Water-proof action is thus exhibited.

In the lens installing/removing apparatus in accordance with the third embodiment, the interchangeable lens 2 can be installed and removed similarly by the method discussed in the first embodiment. It is to be noted that a water-proof property is kept even by constructing, absolutely in the same manner, the transmission mechanisms between the aperture lever 5 and the aperture control lever 12, between the open aperture value signal member 6 and the open aperture value interlocking member 13, between the lens contact point unit 7 and the body contact point unit 14, and between the focal distance signal member 8 and the focal distance signal interlocking member 16 in the signal transmission mechanism between the interchangeable lens 2 and the body 1.

Based on the structure described above, the interchangeable lens 2 may be simply fitted in the mount of the body 1 in accordance with this embodiment as compared with the operation of fitting the interchangeable lens 2 in the mount of the body 1 and rotating it in the conventional mount. There are produced effects in which a slide load caused during the installation by use of the O-ring 59 is remarkably reduced; and the operability is ameliorated. This is the same when removing the interchangeable lens 2.

In accordance with the fourth embodiment demonstrated by FIG. 14, a groove 3j is formed over the entire periphery of the fitting part 3e of the lens mount 3, the structure being such that the annular O-ring 59 is fitted in this groove 3f. Thus, the construction is absolutely the same as the third embodiment shown in FIG. 12 except that the O-ring 59 is attached to the lens mount 3.

In accordance with the fifth embodiment demonstrated by FIG. 14, the groove 21f is formed over the entire periphery of an impingement surface 21d of the fixed mount 21, the structure being such that the annular O-ring 59 is fitted in this groove 21f. Hence, when installing the interchangeable lens 2 in the body 1, the impingement surface 3d of the lens mount 3 impinges on the impingement surface 21d of the fixed mount 21. At the same time, the O-ring 59 is compressively deformed. The O-ring 59 comes into a close contact with the impingement surface 3d and the groove 21f as well. The water-proof action is thus developed. The installation and the removal in the fifth embodiment are performed by the same method as that discussed in the first embodiment.

Incidentally, the transmission mechanisms between the lens type signal groove 3g and the lens type signal interlocking member 17 and between the AF coupling shaft 9 and the AF driving shaft 15 are disposed inwardly of the O-ring 59 in addition to the embodiment of FIG. 12 with respect to the signal transmission mechanism and the drive transmission mechanism between the interchangeable lens and the body 1. With this arrangement, the water-proof property is kept even by taking absolutely the same structure as that in the first embodiment. Based on this structure, when installing and removing the interchangeable lens 2, the O-ring 59 does not slide at all, and hence a load thereof becomes zero. Even in the water-proof mount, the identical operability with that in the ordinary mount can be obtained.

Note that the O-ring 59 can be also attached to the lens mount 3 in FIG. 14 as in the same relation between FIGS. 12 and 13.

As discussed above, in accordance with the embodiments demonstrated by FIGS. 12 through 14, the apparatus is applicable to the water-proof mount. Produced in this case is such an advantage that the slide load caused by the O-ring during the installation and removal can be reduced or become zero.

Further, in the respective embodiments given above, the cylindrical motor is employed as the driving source of the movable mount 22. However, a simpler mechanism is attainable by use of an annular ultrasonic motor.

As described in detail, according to the present invention, the interchangeable lens can be automatically installed and removed, thereby exhibiting an effect to improve the operability.

Additionally, the lens installing/removing apparatus is provided on the body side. This yields such an advantage that the conventional interchangeable lens is automatically installed and removed.

Although the illustrative embodiments of the present invention have been described in detail with reference to the accompanying drawings, it is to be understood that the present invention is not limited to those embodiments. Various changes or modification may be effected by one skilled in the art without departing from the scope or spirit of the invention.

What is claimed is:

1. A lens installing/removing apparatus for installing and removing a photographing lens including at least impingement surfaces and bayonet pawls or threads to and from a camera body, said apparatus comprising:
    a fixed mount unit, having an impingement surface which impinges on said impingement surface of said photographing lens, for placing said photographing lens in a predetermined position in the optical axis direction with respect to said camera body;
    a movable mount unit, so supported inwardly of said fixed mount unit as to be rotatable about the optical axis and having bayonet pawls or threads which engage with said bayonet pawls or said threads, for taking an installing position to install said photographing lens in said camera body and a removing position to remove said photographing lens from said camera body; and
    a drive unit which is located in said apparatus to drive said movable mount unit rotationally.

2. The apparatus according to claim 1, further comprising:
    a member for transmitting and receiving a signal with respect to said camera body in accordance with a rotational position of said photographing lens,
    said member having a position for transmitting and receiving the signal and a retreat position for inhibiting the transmission and reception of the signal, said retreat position being taken when said movable mount is driven.

3. The apparatus according to claim 1, wherein said drive unit also serves as a lens drive unit for an auto-focus adjustment of said photographing lens.

4. The apparatus according to claim 1, wherein said drive unit includes a motor.

5. The apparatus according to claim 4, wherein said motor is normally and reversely rotatable.

6. The apparatus according to claim 4, wherein said motor is an ultrasonic motor.

7. The apparatus according to claim 1, further comprising:
    a detection member for detecting a movement of said movable mount unit from said removing position to said installing position; and
    a control portion for controlling said drive unit in accordance with a detection of said detection member.

8. The apparatus according to claim 1, further comprising:
    a detection member for detecting a movement of said movable mount unit from said installing position to said removing position; and
    a control portion for controlling said drive unit in accordance with a detection of said detection member.

9. The apparatus according to claim 1, further comprising:
    an instruction member operable from the outside of said apparatus for instructing said movable mount unit to work, said drive unit working in accordance with an operation of said instruction member.

10. The apparatus according to claim 1, further comprising a water-proof member provided on said fixed mount unit or said impingement surface of said photographing lens.

11. The apparatus according to claim 10, wherein said fixed mount unit or said impingement surface of said photographing lens is provided with a groove portion over the entire circumference thereof, said water-proof member being disposed in said groove portion.

12. A lens installing/removing apparatus for installing and removing a photographing lens including at least impingement surfaces and bayonet pawls or threads to and from a camera body, said apparatus comprising:
    a fixed mount unit, having an impingement surface which impinges on said impingement surface of said photographing lens, for placing said photographing lens in a predetermined position in the optical axis direction with respect to said camera body;
    a movable mount unit, so supported by said fixed mount unit as to be rotatable about the optical axis and having bayonet pawls or threads which engage with said bayonet pawls or said threads, for taking an installing position to install said photographing lens in said camera body and a removing position to remove said photographing lens from said camera body; and
    a drive unit which is located in said apparatus to drive said movable mount unit rotationally.

13. The apparatus according to claim 12, further comprising:
    a member for transmitting and receiving a signal with respect to said camera body in accordance with a position in a peripheral direction of a signal member of said photographing lens,
    said member having a position for transmitting and receiving the signal and a retreat position for inhibiting the transmission and reception of the signal, said retreat position being taken when said movable mount is driven.

14. The apparatus according to claim 12, said drive unit also serves as a lens drive unit for an auto-focus adjustment of said photographing lens.

15. The apparatus according to claim 12, wherein said drive unit includes a motor.

16. The apparatus according to claim 15, wherein said motor is normally and reversely rotatable.

17. The apparatus according to claim 15, wherein said motor is an ultrasonic motor.

18. The apparatus according to claim 12, further comprising:
    a detection member for detecting a movement of said movable mount unit from said removing position to said installing position; and
    a control portion for controlling said drive unit in accordance with a detection of said detection member.

19. The apparatus according to claim 12, further comprising:
    a detection member for detecting a movement of said movable mount unit from said installing position to said removing position; and
    a control portion for controlling said drive unit in accordance with a detection of said detection member.

20. The apparatus according to claim 12, further comprising:
    an instruction member operable from the outside of said apparatus for instructing said movable mount unit to work, said drive unit working in accordance with an operation of said instruction member.

21. The apparatus according to claim 12, further comprising a water-proof member provided on said fixed mount unit or said impingement surface of said photographing lens.

22. The apparatus according to claim 21, wherein said fixed mount unit or said impingement surface of said photographing lens is provided with a groove portion over the entire circumference thereof, said water-proof member being disposed in said groove portion.

* * * * *